(12) United States Patent
Jin et al.

(10) Patent No.: US 10,305,120 B2
(45) Date of Patent: May 28, 2019

(54) POROUS PANEL FOR SEPARATOR OF FUEL CELL

(71) Applicants: HYUNDAI MOTOR COMPANY, Seoul (KR); KIA MOTORS CORPORATION, Seoul (KR)

(72) Inventors: Sang Mun Jin, Yongin-si (KR); Yoo Chang Yang, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 144 days.

(21) Appl. No.: 15/202,838

(22) Filed: Jul. 6, 2016

(65) Prior Publication Data

US 2017/0194659 A1 Jul. 6, 2017

(30) Foreign Application Priority Data

Dec. 30, 2015 (KR) ........................ 10-2015-0189315

(51) Int. Cl.
*H01M 8/02* (2016.01)
*H01M 8/0258* (2016.01)
*H01M 8/0254* (2016.01)
*H01M 8/0263* (2016.01)
*H01M 8/0256* (2016.01)
(Continued)

(52) U.S. Cl.
CPC ....... *H01M 8/0258* (2013.01); *H01M 8/0254* (2013.01); *H01M 8/0256* (2013.01); *H01M 8/0263* (2013.01); *H01M 8/0267* (2013.01); *H01M 2008/1095* (2013.01); *H01M 2250/20* (2013.01)

(58) Field of Classification Search
CPC .... H01M 8/02; H01M 8/0258; H01M 8/0256; H01M 8/0267
See application file for complete search history.

(56) References Cited

U.S. PATENT DOCUMENTS

2005/0026021 A1* 2/2005 Hasegawa ........... H01M 8/2484
429/414
2007/0292738 A1* 12/2007 Yagami ............... H01M 8/0247
429/457

(Continued)

FOREIGN PATENT DOCUMENTS

EP 0884794 A1 12/1998
JP 2007-141552 A 6/2007

(Continued)

OTHER PUBLICATIONS

Korean Office Action issued in Application No. 10-2015-0189315 dated Nov. 21, 2016.

(Continued)

*Primary Examiner* — Kenneth J Douyette
(74) *Attorney, Agent, or Firm* — Morgan Lewis & Bockius LLP

(57) ABSTRACT

A porous panel for a separator of a fuel cell includes a plate-shaped material and uneven lines repeatedly arranged on the porous panel in a direction crossing a gas flow direction. The porous panel is bent at the uneven lines such that upward and downward uneven portions are repeated, and through holes permitting passage of gas formed on opposite sides of each of the uneven lines have an uneven shape.

11 Claims, 6 Drawing Sheets

(51) Int. Cl.
*H01M 8/0267* (2016.01)
*H01M 8/1018* (2016.01)

(56) References Cited

U.S. PATENT DOCUMENTS

| | | | | |
|---|---|---|---|---|
| 2009/0233141 | A1* | 9/2009 | Kushibiki | H01M 8/0247 |
| | | | | 429/514 |
| 2010/0285395 | A1 | 11/2010 | Hayashi et al. | |
| 2011/0076596 | A1 | 3/2011 | Futami et al. | |
| 2013/0149633 | A1 | 6/2013 | Jeong | |
| 2015/0010840 | A1 | 1/2015 | Roshanzamir | |
| 2015/0024301 | A1* | 1/2015 | Kuwata | H01M 8/1004 |
| | | | | 429/480 |

FOREIGN PATENT DOCUMENTS

| | | |
|---|---|---|
| JP | 2014-026822 A | 2/2014 |
| KR | 10-2012-0048056 A | 5/2012 |
| KR | 10-2013-0066795 A | 6/2013 |
| KR | 10-2015-0078554 A | 7/2015 |

OTHER PUBLICATIONS

Extended European Search Report issued in Application No. 16176859.3 dated Oct. 14, 2016.

\* cited by examiner

- PRIOR ART -

- PRIOR ART -

POROUS PANEL FOR SEPARATOR OF FUEL CELL

CROSS REFERENCE TO RELATED APPLICATION

The present application claims the benefit of priority to Korean Patent Application No. 10-2015-0189315, filed on Dec. 30, 2015 with the Korean Intellectual Property Office, the entirety of which is incorporated herein for all purposes by this reference.

TECHNICAL FIELD

The present disclosure relates to a porous panel for a separator of a fuel cell, which is a micro-path structure for the separator of the fuel cell. The porous panel includes a plurality of holes arranged regularly on a micro-channel partition surface and imparts a predetermined angle to the channel, thus improving an ability to diffuse a reacting gas.

BACKGROUND

A micro-porous structure having an open flow field shape rather than an existing channel-shaped path may be inserted into a separator of a fuel cell stack to increase the reaction efficiency of the fuel cell stack. One advantage of the existing traditional channel separator is that reacting-gas and coolant passages are formed by stacking anode/cathode separators defining channels that are the flow passages of the reacting gas, so that it is possible to simplify the structure of a fuel cell. However, surface pressure in the existing traditional channel separator may become non-uniform due to the channel/land shape of the path, so that electric resistance increases. Furthermore, the structure of the gas diffusion layer may be destroyed due to the concentration of excessive stress on a land portion, so that the diffusion ability of the reacting gas is deteriorated.

In a porous-body path separator, however, if a micro-porous structure such as metal/carbon foam or a wire mesh is inserted into the reactive surface instead of the existing channel-shaped path, the flow of the reaction gas and produced water is facilitated and the GDL (Gas Diffusion Layer) is uniformly compressed to distribute surface pressure. Consequently, electric resistance may be minimized and improvement in performance of the fuel cell may be maximized. The existing micro-porous path structure is problematic, however, in that manufacturing costs thereof are high, and a weight and a volume thereof are increased, thus leading to a reduction of mass-productivity.

FIG. 1 is a sectional view illustrating a conventional separator for a porous body structure, and FIG. 2 is a top view illustrating the conventional separator when viewed from a vertical direction. The fuel cell includes a membrane-electrode assembly (MEA) 10 at an intermediate position and a gas diffusion layer (GM) 30, with a porous panel 50 and a separator 70 being coupled thereto. The porous panel 50 of the conventional separator includes a plurality of through holes 54 that are repeatedly formed at regular intervals on left and right sides of each of linear uneven lines 52 perpendicular to a longitudinal direction (gas flow direction). By repeating these linear uneven lines 52 in the gas flow direction (longitudinal direction), the diffusion of gas is increased in the reactive surface. Particularly in a high-current section having high fuel consumption, a flow rate is correspondingly increased, so that the effect of flow resistance is increased by the shape of a porous body and thereby the effect of the porous body is maximized.

Since reacting gas passing through the through holes formed on one side is blocked by a wall surface of a channel, the reacting gas flows in the same manner as G2 in a widthwise direction where adjacent through holes are arranged, so as to pass to the next channel. Therefore, the repetition of such a flow causes a zigzag flow, so that it is possible to increase the ability to diffuse the reacting gas.

When analyzing a driving pattern of a vehicle equipped with the fuel cell stack, 70% or more of an operating region consists of low/middle current where the flow rate of the reaction gas is small. In order to maximize the effect of formed porous body, the porous body should fulfill its effect in a low/middle current section as well as a high current section where the diffusion of the fuel is important.

Since the basic concept of the porous body consists in flow disturbance through the through holes that are formed at regular intervals on a side of the channel to cross the channel, design factors having great effect on the porous body are a width a of each through hole in the porous body and an interval b between the through holes.

If the width a of the hole is greater than the interval b between the adjacent holes, an overlapping section is created between adjacent channels. In this case, flow resistance is not large in the low/middle current section predominantly occupying the operating region of the fuel cell, so that no zigzag flow occurs and most of the fluid escapes through the overlapping sections of the repeated holes, as in G1. Therefore, this is excellent in terms of the concept of the formed porous body, but reduces a real gain of the porous body in the fuel cell vehicle in consideration of a driving pattern of a driver who drives the real fuel cell vehicle.

In contrast, if the interval b between the adjacent holes is greater than the width a of the hole, the overlapping section is eliminated between adjacent channels. Therefore, the flow resistance increases regardless of the flow intensity, so that the zigzag flow is continuously generated as in G2 and the effect of improving the diffusion ability of the porous body is maximized. As the interval between the holes increases, however, the length of the path increases throughout a whole operating region and a differential pressure is entirely increased. Therefore, this increases the number of auxiliary components for driving the fuel cell and thereby causes a reduction in the efficiency of the fuel cell system.

Furthermore, as the interval between the holes increases, an excessive amount of liquid droplets may stay between the holes where flow is relatively weak, thus causing a reduction in the stability of a low-temperature operation and a deterioration in cold-startability of a vehicle.

Therefore, an uneven structure for a separator has been developed, which a capable of maximizing a gas diffusion effect of a porous body regardless of a flow intensity while reducing a differential pressure in the separator and improving a water discharge ability of the separator.

The foregoing is designed merely to aid in the understanding of the background of the present disclosure, and is not intended to mean that the present invention falls within the purview of the related art that is already known to those skilled in the art.

SUMMARY

Accordingly, the present disclosure has been made keeping in mind the above problems occurring in the related art, and the present disclosure is intended to propose a porous panel for a separator of a fuel cell, which is a micro-path structure for the separator of the fuel cell that has a plurality of holes arranged regularly on a micro-channel partition surface and imparts a predetermined angle to the channel, thus improving an ability to diffuse the reacting gas.

Further, the present disclosure is intended to propose a porous panel for a separator of a fuel cell, wherein the porous panel is formed by machining a plate-shaped material, uneven lines are formed on the porous panel to be repeatedly arranged in a direction crossing a gas flow direction, the porous panel is bent at the uneven lines such that upward and downward uneven portions are repeated, and through holes permitting passage of gas are formed on opposite sides of each of the uneven lines in an uneven shape, each of the uneven lines crossing the gas flow direction while forming an acute angle therewith.

The uneven lines may be repeatedly formed to be parallel to each other while being spaced apart from each other by a predetermined distance.

Each of the uneven lines may be shaped such that edges thereof may be alternately repeated to a first side and a second side.

Each of the uneven lines may have an inclined section to connect the edges arranged on the first and second sides thereof with each other.

Each of the uneven lines may be shaped such that a linear section, a section bent to the first side, a linear section, and a section bent to the second side may be repeated.

Each of the uneven lines may include the linear sections disposed on the first and second sides, and an inclined section connecting the linear sections with each other.

Each of the uneven lines may be of a curved corrugated shape that may be alternately bent to the first and second sides thereof.

Through holes disposed on the first side of each of the uneven lines and through holes disposed on the second side thereof may be formed such that ends thereof overlap each other.

The through holes may be elongated holes that may be formed on the opposite sides of each of the uneven lines to be long in a longitudinal direction thereof.

Uneven lines formed on a gas inlet side and uneven lines formed on a gas outlet side may make different angles with the gas flow direction.

An angle between each of the uneven lines formed on the gas inlet side and the gas flow direction may be smaller than an angle between each of the uneven lines formed on the gas outlet side and the gas flow direction.

As is apparent from the above description, the porous panel for the separator of the fuel cell according to the present invention is advantageous in that a plurality of path through holes is repeatedly famed at regular intervals on left and right side of a vertical section of an uneven waveform line, so that a secondary flow additionally occurs depending on a waveform in a zigzag flow of a conventional porous-body path and thereby the ability to diffuse reaction gas is additionally improved.

Further, a linear flow does not occur in a direction perpendicular to a gas flow direction regardless of the interval and size of through holes. Therefore, the effect of improving the diffusion ability of a porous body is maintained regardless of a flow rate of reaction gas, a water discharge ability is improved, and a reduction in differential pressure is realized.

Furthermore, a contact area with a gas diffusion layer increases through a change from an uneven linear line to an uneven waveform line, and improvement in performance is allowed by increasing electrical conductivity between a separator and a gas diffusion layer.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF PREFERRED EMBODIMENTS

Figure 1:
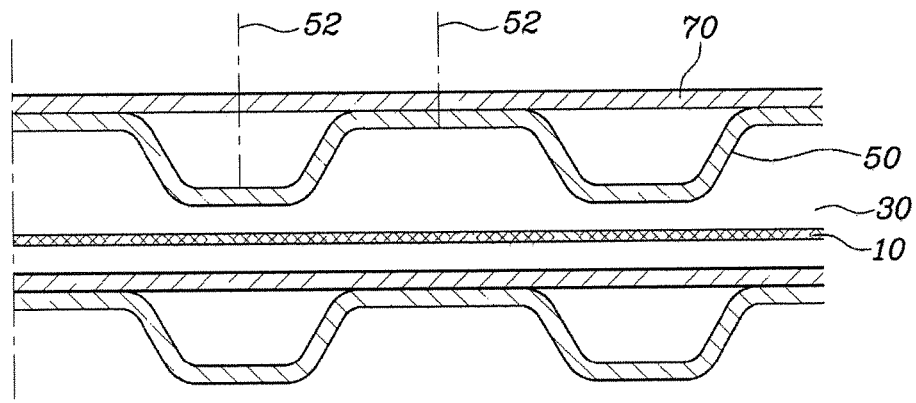
FIG. 1 is a cross-sectional view illustrating a conventional separator that has a porous body structure.
Figure 2:
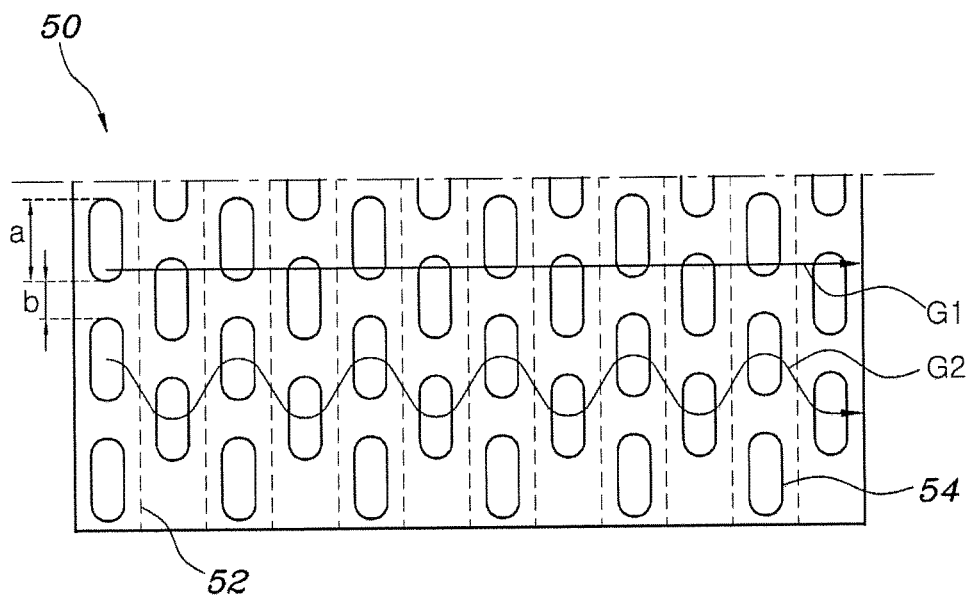
FIG. 2 is a top view illustrating the conventional porous panel when viewed from a vertical direction.
Figure 3:
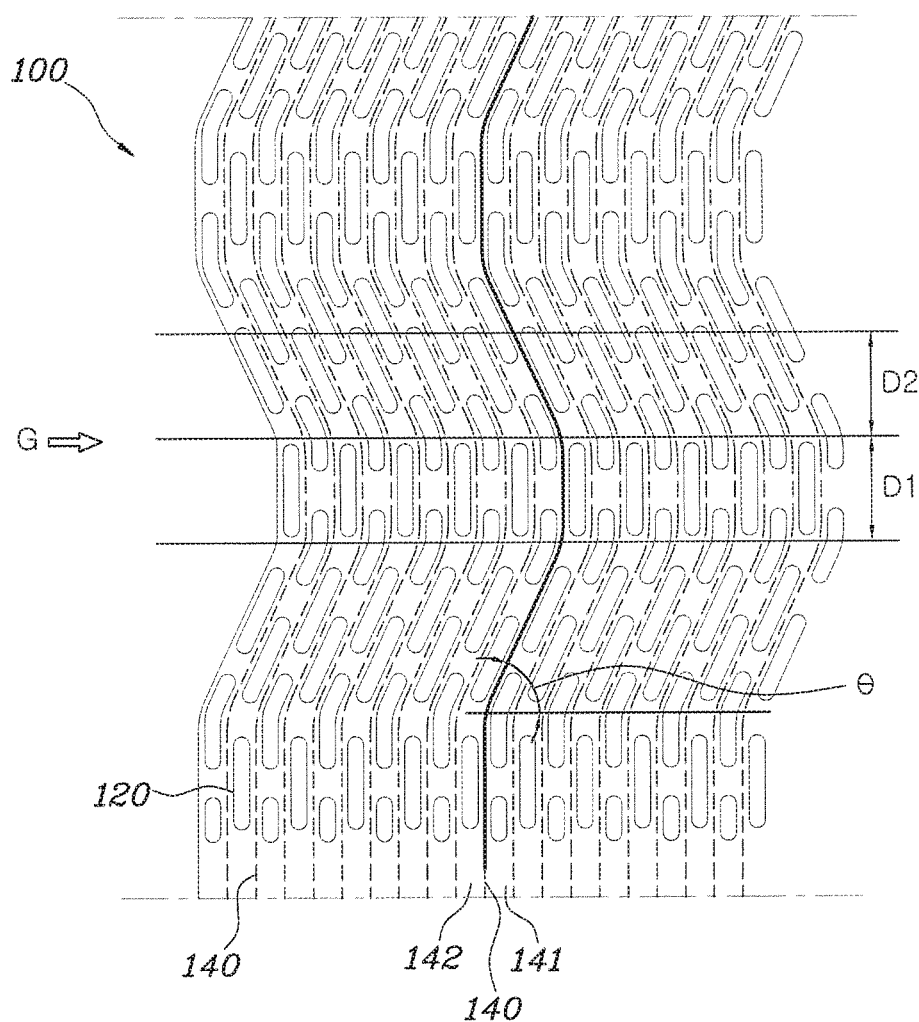
FIG. 3 is a top view illustrating a porous panel for a separator of a fuel cell according to an exemplary embodiment in the present disclosure when viewed from a vertical direction.
Figure 4:
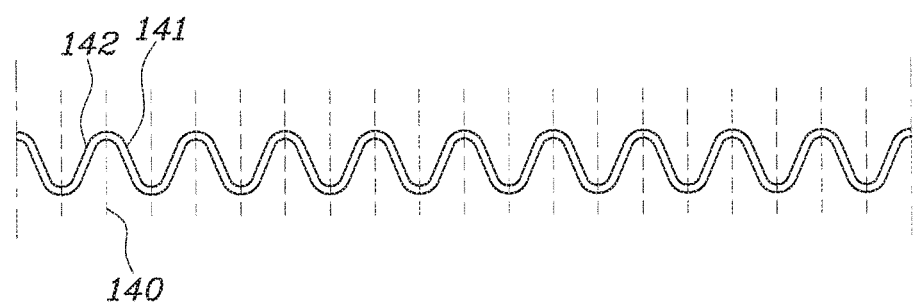
FIG. 4 is a cross-sectional view illustrating the porous panel for the separator of the fuel cell illustrated in FIG. 3.
Figure 6:
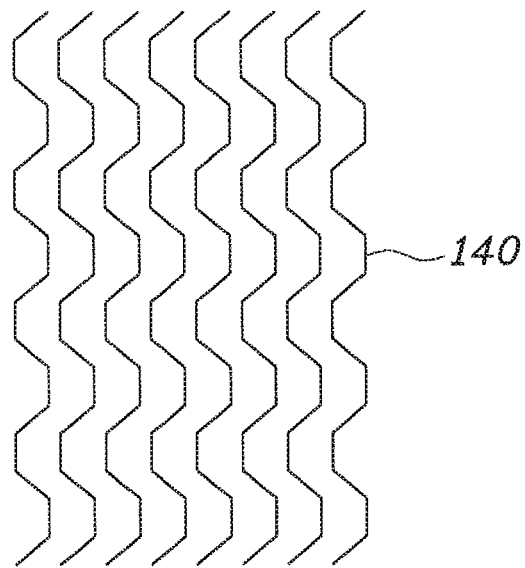
Figure 7:
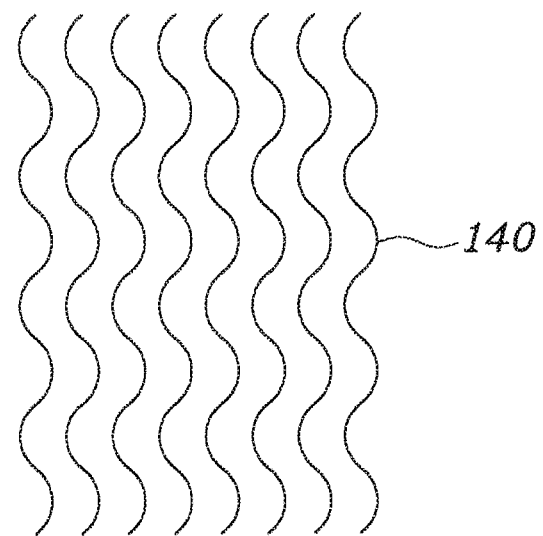
Figure 8:
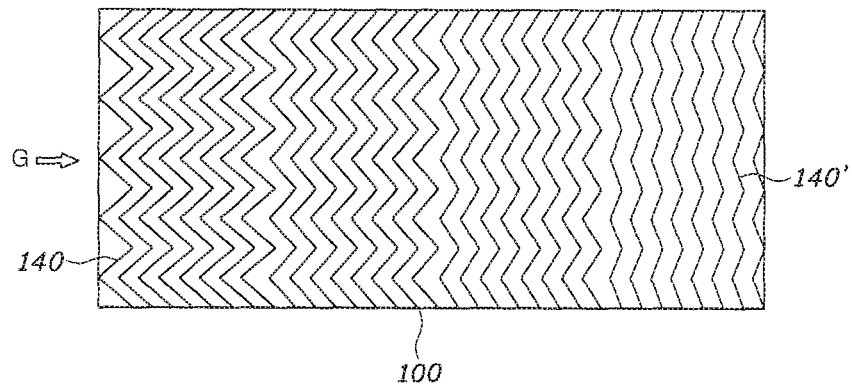
FIG. 8 is a view illustrating the porous panel for the separator of the fuel cell according to another exemplary embodiment.
Figure 9:
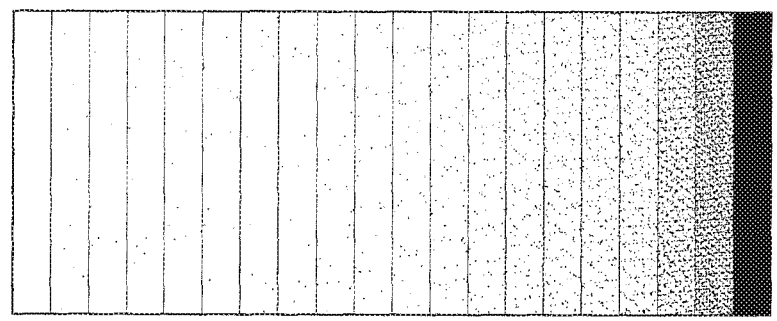
FIG. 9 is a view illustrating a velocity contour of the conventional porous panel of FIG. 2.
Figure 10:
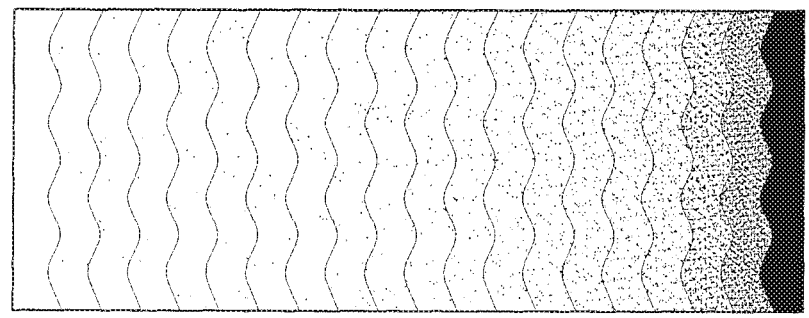
FIG. 10 is a view illustrating a velocity contour of the porous panel according to the exemplary embodiment of FIG. 3.
Figure 11:
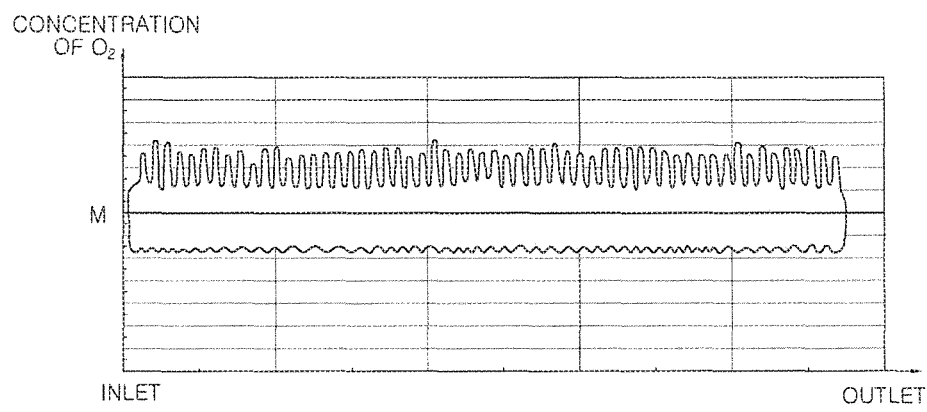
FIG. 11 is a view illustrating an oxygen concentration upon reaching a reactive surface of the conventional porous panel of FIG. 2.
Figure 12:
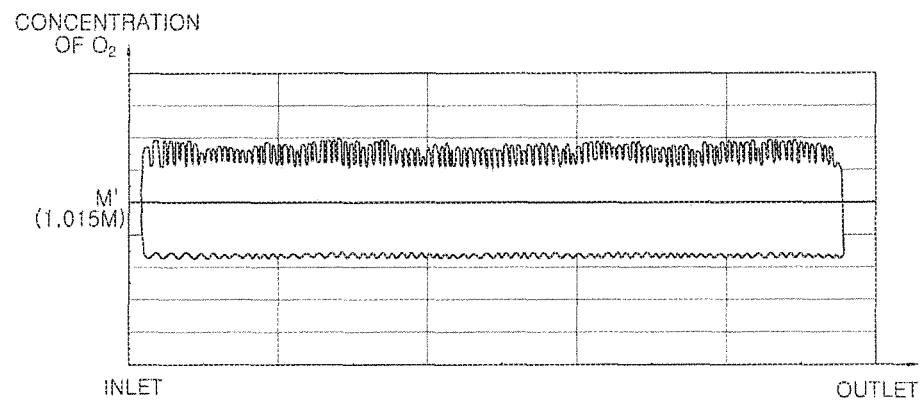
FIG. 12 is a view illustrating an oxygen concentration upon reaching a reactive surface of the porous panel according to the exemplary embodiment of FIG. 3.

FIG. 3 is a top view illustrating a porous panel for a separator of a fuel cell according to an exemplary embodiment in the present disclosure when viewed from a vertical direction, FIG. 4 is a cross-sectional view illustrating the porous panel for the separator of the fuel cell illustrated in FIG. 3, FIGS. 5 to 7 are views illustrating uneven lines of a porous panel for a separator of a fuel cell according to additional exemplary embodiments in the present disclosure, FIG. 8 is a view illustrating the porous panel for the separator of the fuel cell according to an additional exemplary embodiment, FIG. 9 is a view illustrating a velocity contour of the conventional porous panel of FIG. 2, FIG. 10 is a view illustrating a velocity contour of the porous panel according to the exemplary embodiment of FIG. 3, FIG. 11 is a view illustrating an oxygen concentration upon reaching a reactive surface of the conventional porous panel of FIG. 2, and FIG. 12 is a view illustrating an oxygen concentration upon reaching a reactive surface of the porous panel according to the exemplary embodiment of FIG. 3.

FIG. 3 is a top view illustrating a porous panel for a separator of a fuel cell according to an exemplary embodiment when viewed from a vertical direction, and FIG. 4 is a cross-sectional view illustrating the porous panel for the separator of the fuel cell illustrated in FIG. 3. As illustrated in FIG. 3, the porous panel for the separator of the fuel cell according to the present invention is formed by processing a plate-shaped material. It is possible to machine a through hole while simultaneously forming an uneven shape predominantly using a pressing machine or the like. Alternatively, the uneven shape may be first made through a mold and subsequently the through hole may be formed through a secondary process.

The porous panel 100 is located between a separator 70 and a gas diffusion layer 30, and guides gas G from left to right while simultaneously diffusing the flow of the gas G in a non-linear form, thus allowing the gas to more reliably react with the gas diffusion layer.

To this end, according to the present disclosure, an uneven line 140 is applied to the porous panel 100, and then the porous panel is bent with respect to the uneven line 140 such that an entire section of the porous panel has an uneven shape, as illustrated in FIG. 4. In this regard, the uneven line 140 means a central line of an uneven portion that protrudes upwards or downwards. Such an uneven line takes the shape of a continuous extending line when viewing the separator from the top, as illustrated in the drawing.

Although the section of FIG. 4 shows a bent shape to have a sinusoidal shape, an uneven portion may be formed to have a sharp edge about the uneven line 140. FIG. 3 is a top view illustrating the porous panel 100. An uneven structure cannot be seen in FIG. 3, but the uneven structure having uneven portions that are repeated in a vertical direction can be seen in FIG. 4 that is a sectional view of the porous panel 100.

As such, the porous panel 100 may have a plurality of imaginary uneven lines 140. The uneven lines 140 may be repeatedly formed in a direction crossing a flow direction of the gas G. That is, the uneven lines 140 are not formed to be parallel or perpendicular to flow direction of the gas G, but are formed to cross the flow direction of the gas G at a predetermined angle. Consequently, the uneven lines 140 are formed in a zigzag fashion when viewed from the top.

Such a porous panel 100 is bent with respect to the uneven line 140. In detail, as shown in FIG. 4, the porous panel 100 is bent such that upward and downward uneven portions are repeated. Through holes 120 through which the gas flows are formed on opposite sides 141 and 142 of the uneven line 140 in the uneven shape, and the uneven line 140 is formed to cross the flow direction of the gas G while extending in the zigzag fashion. In addition, uneven lines 140 may be repeatedly formed to be parallel and spaced apart from each other by a predetermined distance. Each uneven line 140 forms an acute angle with the flow direction of the gas. Thus, the uneven line is not parallel or perpendicular to the flow direction of the gas G but crosses the flow direction of the gas G at a predetermined acute angle.

FIG. 3 shows the shape of the porous body that has an uneven waveform portion by repeating inclined uneven portions D2 and linear uneven portions D1. Each of the uneven inclined portions D2 forms a waveform angle θ of 30° with the gas flow direction, and each of the uneven linear portions D1 is perpendicular to the gas flow direction. Such a configuration may achieve the following effects.

1) Since a plurality of through holes 120 is repeatedly formed at regular intervals on left and right sides of a vertical section of the uneven waveform portion, a secondary flow additionally occurs according to the waveform in a zigzag flow of the existing porous-body path, and the diffusion ability of reaction gas is further improved.

2) No linear flow occurs in the direction perpendicular to the gas flow direction regardless of the intervals and sizes of the holes. Therefore, it is possible to maintain improvement in the diffusion ability of the porous body regardless of the flow rate of the reaction gas, to improve a water discharge ability, and to reduce a differential pressure.

3) A contact area with the gas diffusion layer increases by changing the uneven portion from a linear structure into a waveform structure, and performance is improved by increasing electrical conductivity between the porous body and the gas diffusion layer.

Figure 5:
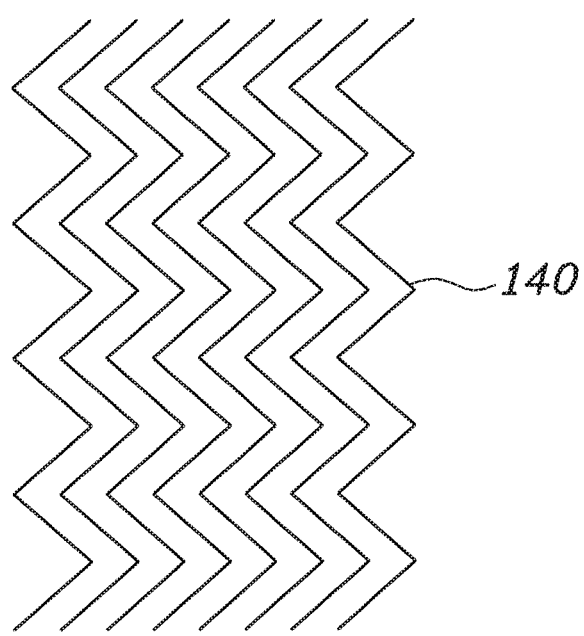
FIGS. 5 to 7 are views illustrating uneven lines of a porous panel for a separator of a fuel cell according to additional exemplary embodiments.

FIGS. 5 to 7 are views illustrating uneven lines of a porous panel for a separator of a fuel cell according to additional exemplary embodiments. As illustrated in FIG. 5, the uneven line 140 may have a zigzag shape in which edges thereof are alternately repeated to one side and the other side. In this case, the uneven line 140 may have inclined sections that connect the edges arranged on opposite sides thereof with each other.

Alternatively, as shown in FIG. 6, the uneven line 140 may have a zigzag shape in which linear sections thereof are alternately repeated to one side and the other side. In this case, the uneven line 140 may have the linear sections arranged on opposite sides thereof and inclined sections that connect the linear sections with each other.

Furthermore, as in FIG. 7, the uneven line 140 may have a curved corrugated shape extending in a zigzag fashion.

In the embodiment of FIG. 5, if an angle of the uneven waveform shape is too large, the risk of a rupture occurring at a portion where the waveform angle is made increases. Therefore, the zigzag angle (acute angle) of the waveform is preferably in the range of 20 to 70° in consideration of the manufacturability and distribution ability of the porous body.

In the embodiment of FIG. 6, the uneven waveform shape may be formed such that uneven inclined sections forming a predetermined angle with the gas flow direction and the uneven linear section perpendicular to the gas flow direction are repeated.

In the embodiment of FIG. 7, the uneven waveform shape may be a curved wave shape. This eliminates a section that is subjected to sudden change in shape, so that manufacturability is improved.

As shown in FIG. 3, through holes disposed on one side of the uneven line 140 and through holes disposed on the other side thereof may be formed such that ends thereof overlap each other. The through holes 120 may be elongated holes that are formed on the opposite sides 141 and 142 of the uneven line 140 to be long in a longitudinal direction thereof.

As shown in FIG. 8, the uneven lines 140 formed on a gas inlet side and the uneven lines 140' formed on a gas outlet side may have different zigzag angles. To be more specific, the zigzag angle or each of the uneven lines 140 formed on the gas inlet side may be smaller than the zigzag angle of each of the uneven lines 140' formed on the gas outlet side. FIG. 8 is a view illustrating the porous panel for the separator of the fuel cell according to the embodiment of the present invention. As for the gas inlet side, the flow at a reactive-surface inlet where fuel is introduced into the reactive surface is not sufficiently developed, so that an ability to diffuse gas to the reactive surface is deteriorated as compared to a remaining portion.

Furthermore, at the gas outlet side, when the reaction gas flows to the outlet, the flow is sufficiently developed but the amount of water produced by the reaction is increased. Thus, a portion of the uneven line that is relatively near to the reactive-surface inlet has a small inclination angle to have a relatively sharp zigzag shape, thereby promoting the diffusion of the flow due to the waveform shape, while a portion of the uneven line that is near to the outlet has a large angle to have a relatively smooth zigzag shape, thereby reducing a flow resistance and allowing water to be smoothly discharged.

FIG. 9 is a view illustrating a velocity contour of the conventional porous panel of FIG. 2, and FIG. 10 is a view illustrating a velocity contour of the porous panel according to the exemplary embodiment of FIG. 3. FIG. 9 relates to the porous panel having uneven lines perpendicular to the gas flow direction, and FIG. 10 is a flow analysis concerning the porous panel in which the inclination angle of the uneven zigzag-shaped line forms the angle of 45° with the gas flow. According to the comparison result of the velocity contours, it can be seen that a velocity field of a wave flow appears in FIG. 10 depending on the shape of the uneven line, and thereby the uneven zigzag shape improves the flow diffusion.

FIG. 11 is a view illustrating an oxygen concentration upon reaching the reactive surface of the conventional porous panel of FIG. 2, and FIG. 12 is a view illustrating an oxygen concentration upon reaching the reactive surface of the porous panel according to the exemplary embodiment of FIG. 3. In FIG. 12, it can be seen that the oxygen concentration is relatively uniform in the uneven waveform shape where the zigzag angle of the uneven line is 45° and a larger amount of oxygen reaches the reactive surface. This is determined by comparing oxygen-concentration mean values M and M' with each other, and, as shown in FIG. 12, M' is greater than M. The uniform oxygen concentration means that a larger amount of oxygen uniformly reaches the reactive surface and the performance of the fuel cell may be improved.

As described above, the present disclosure provides a porous panel for a separator of a fuel cell, in which a plurality of path through holes is repeatedly formed at regular intervals on left and right side of a vertical section of an uneven waveform line, so that a secondary flow additionally occurs depending on a waveform in a zigzag flow of a conventional porous-body path and thereby the ability to diffuse reaction gas is additionally improved.

Further, a linear flow does not occur in a direction perpendicular to a gas flow direction regardless of the interval and size of through holes. Therefore, the effect of improving the diffusion ability of a porous body is maintained regardless of a flow rate of reaction gas, a water discharge ability is improved, and a differential pressure is reduced.

Furthermore, a contact area with a gas diffusion layer increases through a change from an uneven linear line to an uneven waveform line, and performance is improved by increasing electrical conductivity between a separator and a gas diffusion layer.

Although multiple exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A porous panel for a separator of a fuel cell, comprising a plate-shaped material, uneven lines repeatedly arranged on the porous panel in a direction crossing a gas flow direction, and through holes permitting passage of a gas formed on a surface of opposite sides of each of the uneven lines in an uneven shape, wherein the porous panel is bent at the uneven lines such that upward and downward uneven portions of the porous panel are repeated,
wherein each of the uneven lines on a surface of the porous panel is alternately directed to a first side and a second side of the porous panel.

2. The porous panel as set forth in claim 1, wherein the uneven lines are parallel to each other while being spaced apart from, each other by a predetermined distance.

3. The porous panel as set forth in claim 1, wherein each of the uneven lines has a straight zigzag shape.

4. The porous panel as set forth in claim 1, wherein each of the uneven lines is shaped such that a first linear section, a section directed to the first side, a second linear section, and a section directed to the second side are repeated.

5. The porous panel as set forth in claim 4, wherein each of the uneven lines comprises the first and second linear sections directed to the first and second sides, and an inclined section connecting the first and second linear sections to each other.

6. The porous panel as set forth in claim 1, wherein each of the uneven lines is of a curved corrugated shape that is alternately directed to the first and second sides thereof.

7. The porous panel as set forth in claim 1, wherein through holes disposed on the first side of each of the uneven lines and through holes disposed on the second side thereof are formed such that ends thereof overlap each other.

8. The porous panel as set forth in claim 1, wherein the through holes are elongated holes formed on the opposite sides of each of the uneven lines to have a greater length in a longitudinal direction thereof than in a latitudinal direction thereof.

9. The porous panel as set forth in claim 1, wherein uneven lines formed on a gas inlet side and uneven lines formed on a gas outlet side make different angles with the gas flow direction.

10. The porous panel as set forth in claim 1, wherein an angle between each of the uneven lines formed on the gas inlet side and the gas flow direction is smaller than an angle between each of the uneven lines formed on the gas outlet side and the gas flow direction.

11. The porous panel as set forth in claim 1, wherein each of the uneven lines crossing the gas flow direction forms an acute angle therewith.

* * * * *